(12) United States Patent
Foster

(10) Patent No.: US 8,661,783 B2
(45) Date of Patent: Mar. 4, 2014

(54) HEAT EXCHANGER HAVING SWIRLING MEANS

(75) Inventor: Peter F W Foster, Burton Upon Trent (GB)

(73) Assignee: Rolls-Royce PLC, London (GB)

( * ) Notice: Subject to any disclaimer, the term of this patent is extended or adjusted under 35 U.S.C. 154(b) by 2 days.

(21) Appl. No.: 13/524,460

(22) Filed: Jun. 15, 2012

(65) Prior Publication Data

US 2012/0324859 A1 Dec. 27, 2012

(30) Foreign Application Priority Data

Jun. 27, 2011 (GB) .................................. 1110796.8

(51) Int. Cl.
*F02K 99/00* (2009.01)

(52) U.S. Cl.
USPC ............. 60/267; 60/266; 60/39.093; 60/772; 62/460; 165/109.1; 244/134 R; 244/134 B; 244/134 C; 244/134 D

(58) Field of Classification Search
USPC .................. 244/134 R, 134 B, 134 C, 134 D; 60/39.093, 39.01, 266, 267, 772, 730; 165/109.1, 120–125
See application file for complete search history.

(56) References Cited

U.S. PATENT DOCUMENTS

| | | | |
|---|---|---|---|
| 2,925,712 A | | 2/1960 | Johnson et al. |
| 2,988,335 A | * | 6/1961 | Disinger et al. ................. 165/83 |
| 3,557,557 A | * | 1/1971 | Prachar ........................... 60/257 |
| 4,759,401 A | * | 7/1988 | Pfouts et al. ..................... 165/51 |
| 4,832,114 A | * | 5/1989 | Yeh ................................. 165/85 |
| 6,440,317 B1 | * | 8/2002 | Koethe ........................... 210/774 |
| 2010/0243208 A1 | | 9/2010 | Kar et al. |
| 2010/0300067 A1 | * | 12/2010 | Boman ............................ 60/267 |

FOREIGN PATENT DOCUMENTS

| | | |
|---|---|---|
| DE | 317 680 C | 12/1919 |
| DE | 10 2010 025 998 A1 | 3/2012 |
| EP | 0 638 732 A1 | 2/1995 |
| GB | 2 276 231 A | 9/1994 |
| JP | A-2007-046890 | 2/2007 |
| KR | 10-0809081 B1 | 3/2008 |

OTHER PUBLICATIONS

British Search Report issued in Application No. 1110796.8; Dated Oct. 21, 2011.
European Search Report issued in Application No. 12 17 2200; Dated Oct. 24, 2012.

* cited by examiner

*Primary Examiner* — Gerald L Sung
*Assistant Examiner* — Craig Kim
(74) *Attorney, Agent, or Firm* — Oliff PLC

(57) ABSTRACT

A heat exchanger is provided for warming fuel prior to introduction of the fuel to an engine, the heat exchanger including: a fuel inlet and a fuel outlet; a heat exchange matrix having heat transfer components past which the fuel flows between said inlet and said outlet and which are arranged to be heated; and swirl inducing means arranged between said inlet and said matrix arranged to cause fuel from said inlet to swirl prior to entering said matrix. By causing the fuel to swirl prior to entering the heat exchange matrix, entrained ice in the fuel can be caused to concentrate at an outer region of the heat exchanger thereby allowing fuel to continue to flow through the heat exchanger to the engine even when ice is present in the fuel.

17 Claims, 5 Drawing Sheets

HEAT EXCHANGER HAVING SWIRLING MEANS

FIELD OF THE INVENTION

The present invention relates to a heat exchanger and a method of operating a heat exchanger. The invention is particularly, but not exclusively, concerned with a heat exchanger which pre-heats fuel being supplied to a gas turbine and in which the effects of fuel borne ice can be reduced.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted.

The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The fuel flow supplied to gas turbine engines can contain water. During operation under low ambient temperature operating conditions if the fuel is at a temperature below 0° C., the water will freeze. In these circumstances the fuel will normally enter the engine containing dispersed ice particles in suspension in the fuel. These ice particles present a problem for the fuel system in that they can block small passages and cause fine clearance valves to malfunction.

This problem is normally overcome by heating the fuel, using heat from the engine oil, via an fuel-oil heat exchanger. A typical arrangement of such a fuel-oil heat exchanger is shown in FIG. 2, A fuel-oil heat exchanger 30 is arranged in the fuel flow path 60 from the fuel tank (not shown) to the burners 71 of the engine. Fuel passing through the fuel-oil heat exchanger 30 is heated by an oil circuit 80 which supplies hot oil from the engine through surface coolers 81 (or via oil bypass valve 82) to the heat exchanger 30. The heated fuel subsequently passes to the low pressure filter 65 to the hydro-mechanical unit 68 which performs fuel management functions in response to pilot demand for thrust and controls turbine case cooling (TCC) and the variable stator vane actuator (VSVA). The fuel then passes through flow meter 69 and high pressure filter 70 to the burners 71.

However, if there is ice accumulation in the fuel pipe work supplying the engine, this ice accumulation can break away or "shed" and result in a large quantity of ice arriving at the engine over a short period of time. Such quantities of ice can overwhelm and block the fuel-oil heat exchanger and as a result interrupt the fuel supply causing the fuel system to malfunction and the engine to loose power.

Prior art systems, for example as shown in FIG. 2, address this problem by providing a bypass valve 64 which provides an alternative route for fuel to reach the engine. If the heat exchanger 30 becomes blocked with ice a pressure operated bypass valve 64 opens to allow fuel to bypass the blocked heat exchanger and still be supplied to the downstream components 65-71 described above to enable the engine to continue to operate. The heat exchanger fuel side inlet is designed to have sufficient volume to accommodate expected transient quantities of ice, such that when the bypass opens only fuel with the normal (steady state) level of ice concentration will pass to the downstream fuel system components.

However, when the fuel side of the heat exchanger 30 is blocked and the bypass valve 64 is open, the fuel flow to the downstream components is no longer heated. Such fuel will still contain ice and the continued operation of the engine in this state therefore relies on the ice tolerance of the downstream components. In many cases, these components (in particular units such as filters) will only have a finite capability to deal with the ice content of the fuel. This means that it is important that the ice collected in the heat exchanger inlet melts quickly so that it can properly pass fuel and provide heated fuel with no ice. For example, the low pressure filter 65 may also need to be provided with a bypass valve 66 which operates if the pressure difference across the filter as measured by the pressure sensor 67 becomes too great due to ice accumulation.

Another problem with this arrangement is that it relies on the transiently high level of ice in the fuel to occur over a short period of time, such that all of this ice is captured in the heat exchanger inlet before the bypass is opened, otherwise fuel could be delivered to the downstream components which still contains high concentrations of ice which would cause malfunction of those components.

Aspects of the present invention seek to address or ameliorate the above problems.

SUMMARY OF THE INVENTION

At its broadest, a first aspect of the present invention provides a heat exchanger in which the fuel entering the heat exchanger is caused to swirl in order to separate any entrained ice. This allows different parts of the heat exchanger to be adapted to deal with the ice whilst fuel with low or zero concentrations of ice continues to pass through the heat exchanger to downstream components.

Accordingly, a first aspect of the present invention provides a heat exchanger for warming fuel prior to introduction of the fuel to an engine, the heat exchanger including: a fuel inlet and a fuel outlet; a heat exchange matrix having heat transfer components past which the fuel flows between said inlet and said outlet and which are arranged to be heated; and swirl inducing means arranged between said inlet and said matrix arranged to cause fuel from said inlet to swirl prior to entering said matrix.

By causing the fuel to swirl prior to entering the heat exchange matrix, ice particles entrained in the fuel can be concentrated in a particular area of the heat exchanger thereby leaving other areas of the heat exchanger free from ice particles and allowing fuel which is free of, or which contains a reduced amount of ice, to pass through the heat exchanger and on to downstream fuel system components and the engine.

Preferably the swirl inducing means is arranged to cause the fuel to swirl about an axis which is substantially parallel to the main direction of fuel flow through said matrix. This action causes ice particles entrained in the fuel to concentrate in outer regions of the heat exchanger and therefore leave a central region of the heat exchanger free from deposited ice particles to permit fuel flow.

Different forms of the swirl inducing means may be employed. In one embodiment, the swirl inducing means forms part of said fuel inlet and is arranged to cause the fuel to enter the heat exchanger substantially perpendicular to the main direction of fuel flow through said matrix and at a position offset from a central axis of the heat exchanger.

In one arrangement of this embodiment, the heat exchanger is substantially cylindrical and the swirl inducing means is arranged to cause the fuel to enter the heat exchanger substantially tangentially. A cylindrical configuration of the heat exchanger, at least in the region of the fuel entry, is likely to result in a swirling flow of the fuel which is assisted by the curve of the interior of the heat exchanger and that the swirling flow of the fuel is maintained up to the point at which the fuel enters the heat exchange matrix.

In another embodiment the swirl inducing means includes a guide vane arranged to cause the fuel to swirl prior to the fuel entering said matrix. The swirl inducing means may include a plurality of such guide vanes. Guide vanes may be used to cause fuel which enters a heat exchanger in standard fashion to swirl. A plurality of guide vanes may be used to improve the uniformity of the swirled fuel flow.

In another embodiment the swirl inducing means includes a driven element which is arranged to cause the fuel to swirl prior to the fuel entering said matrix. For example the driven element may be an impeller which is arranged to rotate about an axis which is substantially parallel to the main direction of fuel flow through said matrix.

A driven element as part of the swirl inducing means can ensure that a sufficient velocity of swirling fuel flow is achieved in the heat exchanger, and in particular that the velocity of the swirling fuel flow is not affected by the rate of fuel flow entering the heat exchanger.

A plurality of different swirl inducing means, including some, all or none of the specific swirl inducing means set out above may be combined in a heat exchanger.

A second aspect of the present invention provides a gas turbine engine having a heat exchanger according to the above first aspect, including some, all or none of the optional or preferred features of that aspect.

A gas turbine engine according to this aspect provides for improved resistance to icing in the fuel input to the engine and therefore improved safety in operation and a wider operating range for the engine. The provision of a heat exchanger according to the above first aspect may mean that the ice tolerance of the fuel supply system of the engine downstream of the heat exchanger can be reduced due to the improved ice treatment carried out in the heat exchanger.

At its broadest, a further aspect of the present invention provides a method of treating fuel, the method including the step of causing fuel to swirl in the early part of a heat exchanger so that entrained ice is concentrated in a specific portion of the fuel flow.

Accordingly, a third aspect of the present invention provides a method of treating fuel having entrained ice in a heat exchanger, the method including the steps of: causing said fuel to swirl so that the entrained ice concentrates in an outer portion of the fuel is flow; passing the swirled fuel through a heat exchanger matrix.

By causing entrained ice to concentrate in a specific portion of the fuel flow, the heat exchanger can be constructed so as to deal with the concentration of ice in that portion of flow whilst allowing the portion of the fuel flow which has a lower concentration of entrained ice (or no entrained ice) to pass through the heat exchanger and on to the downstream components in the fuel supply system.

The step of causing the fuel to swirl may cause at least some of the entrained ice to deposit on a surface of the heat exchanger prior to the fuel entering the heat exchanger matrix. This ice may therefore be prevented from entering the heat exchange matrix and blocking it.

Preferably the method further includes the step of heating the surface on which the ice is deposited so that ice deposited on that surface melts and is subsequently entrained in the fuel flowing through the matrix.

In one embodiment, the step of causing said fuel to swirl includes causing the fuel to enter the heat exchanger substantially perpendicular to the main direction of fuel flow through said matrix and at a position offset from a central axis of the heat exchanger. In another embodiment the step of causing said fuel to swirl includes mechanical agitation of the fuel.

Preferably the method of this aspect is carried out using a heat exchanger according to the above first aspect, but this is not required.

BRIEF DESCRIPTION OF THE DRAWINGS

Embodiments of the invention will now be described by way of example with reference to the accompanying drawings in which.

DETAILED DESCRIPTION

Figure 1:
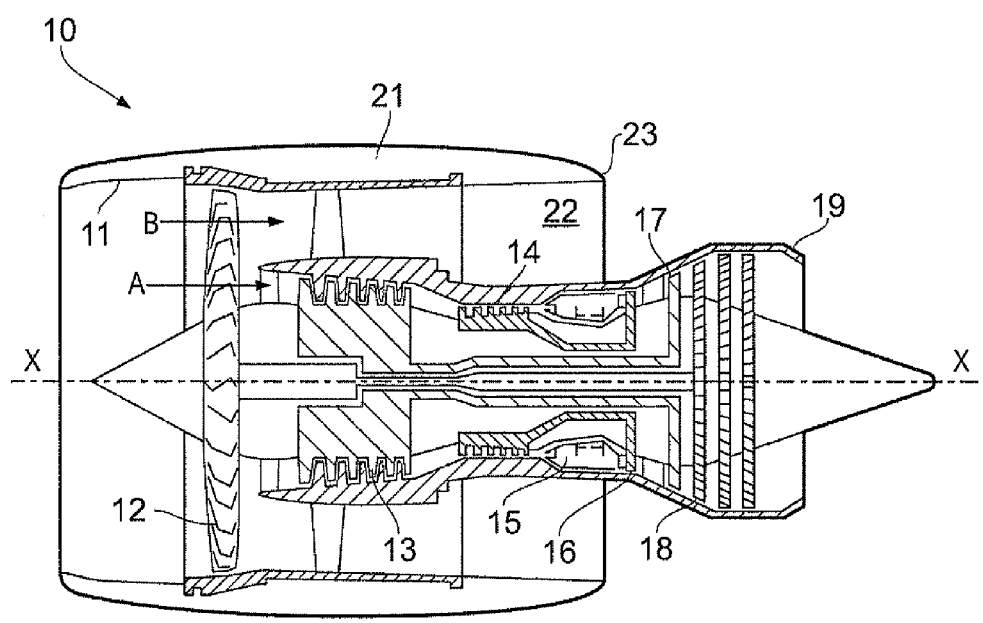
FIG. 1 shows a schematic longitudinal cross-section through a ducted fan gas turbine engine and has already been described.
Figure 2:
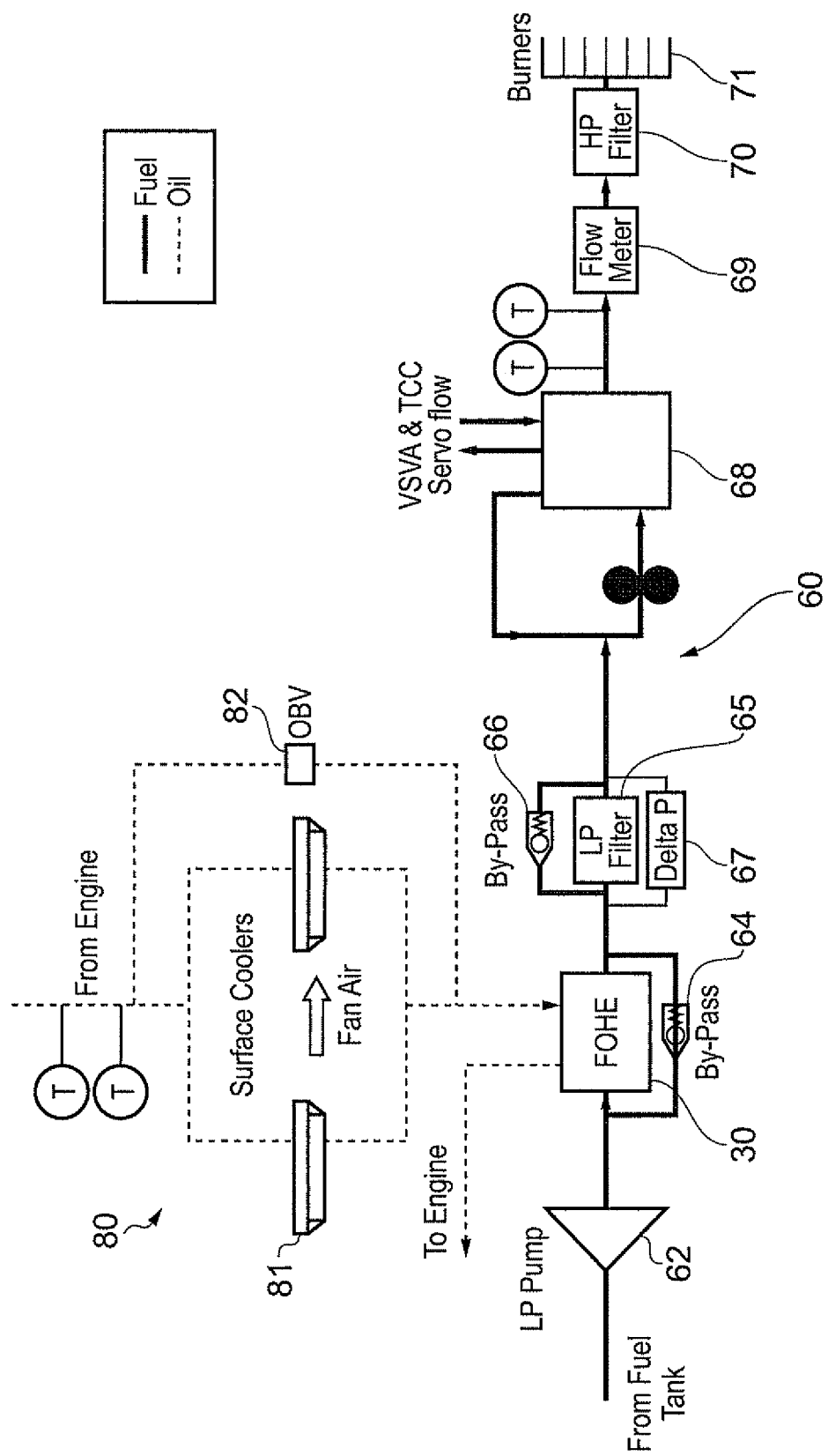
FIG. 2 shows a schematic arrangement of a fuel-oil heat exchanger and the associated components in which embodiments of the present invention may be used.

FIG. 2 shows a schematic arrangement of a fuel-oil heat exchanger as used in the fuel supply to a gas turbine engine and the associated components. The main components of this system have already been explained above. In embodiments of the present invention the heat exchanger 30 is a heat exchanger according to the present invention and the by-pass valve 64 can therefore be removed (or, if present, operates only in extreme conditions).

Figure 3A:
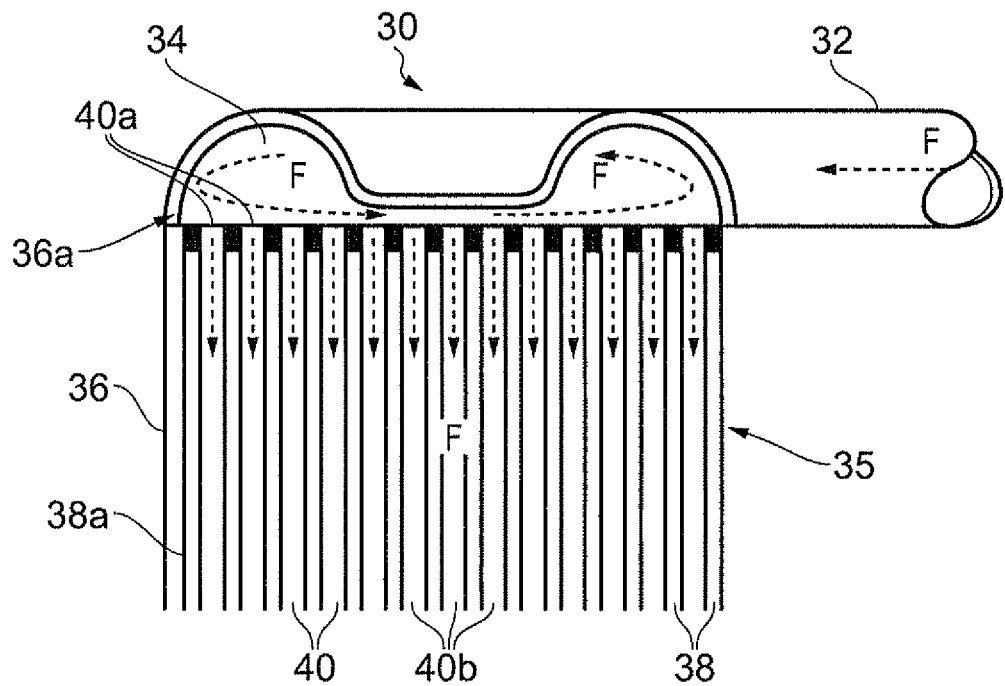
FIGS. 3a and 3b respectively show a cross-section through a heat exchanger according to an embodiment of the present invention and an external perspective view of that heat exchanger.
Figure 3B:
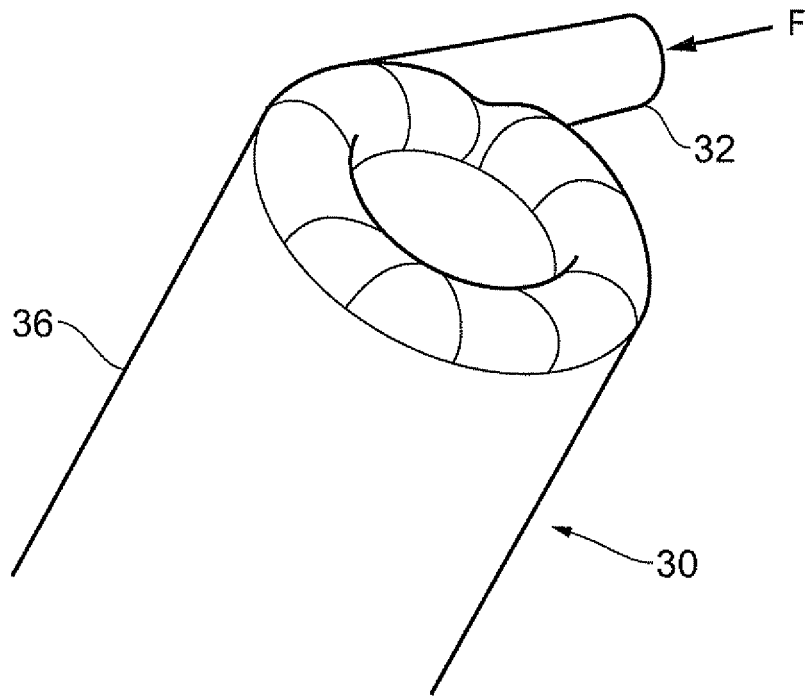
Figure 4:
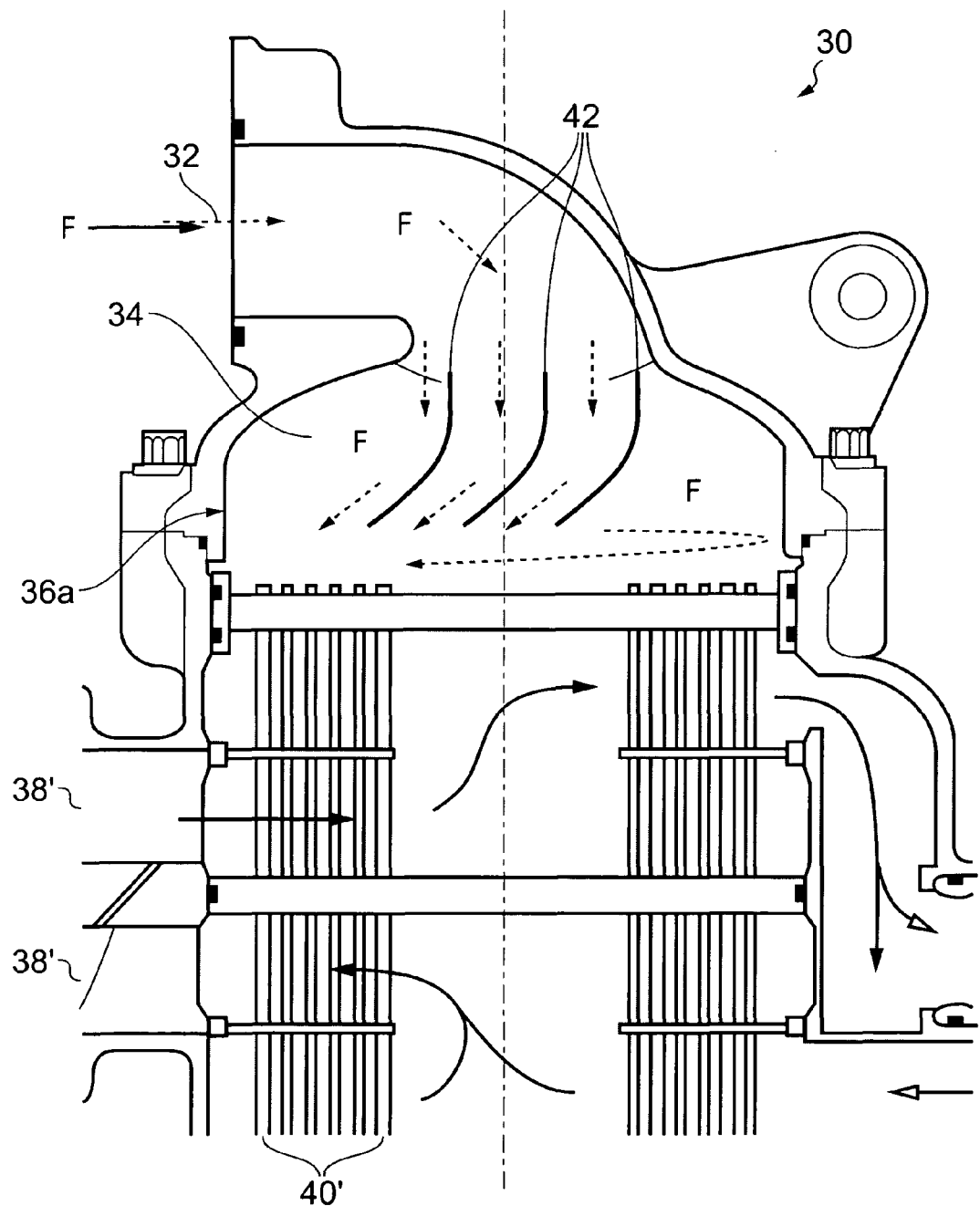
FIG. 4 shows a cross-section through a heat exchanger according to a further embodiment of the present invention.
Figure 5:
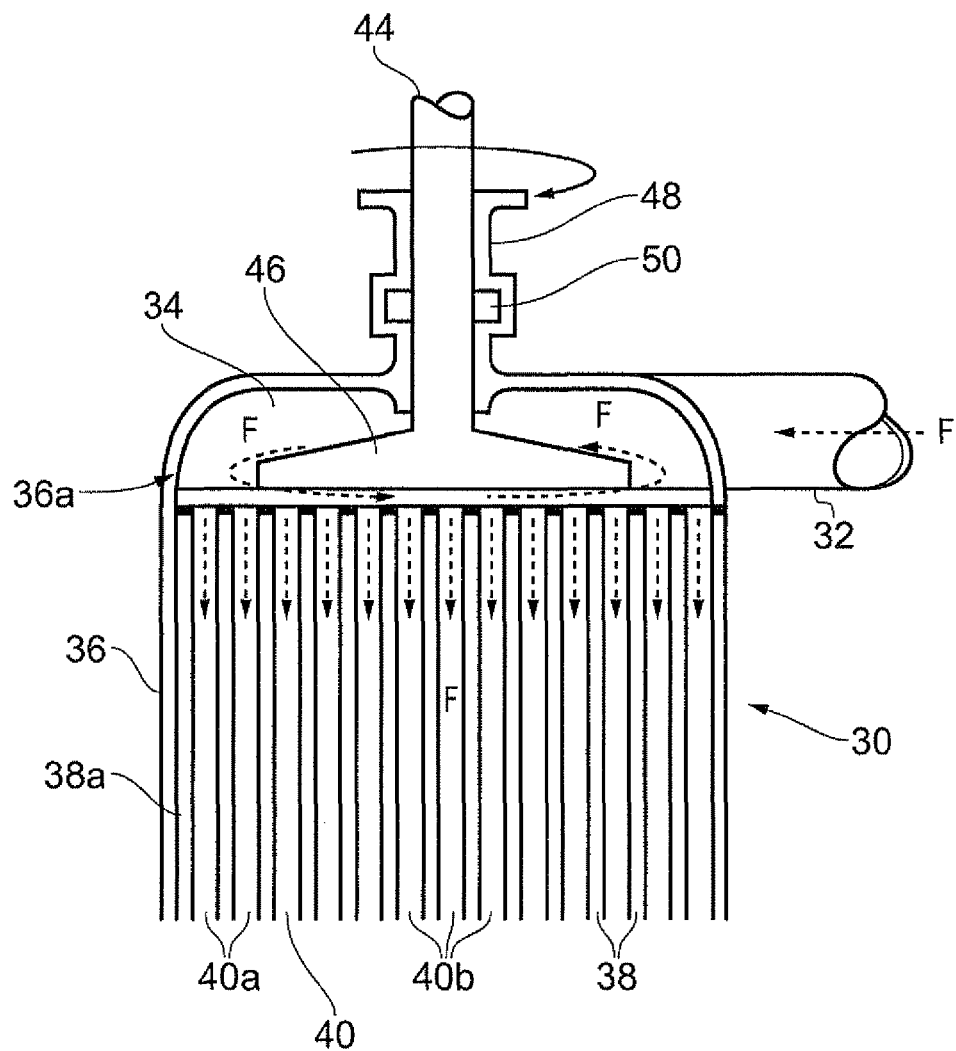
FIG. 5 shows a cross-section through a heat exchanger according to a further embodiment of the present invention.

FIGS. 3-5 show heat exchangers according to embodiments of the present invention. For ease of reference, the same reference numerals will be used to refer to identical components in each of the embodiments. Where components are substantially identical, but adapted for the specific embodiment, then the same reference numeral will be used but a prime attached to indicate that the components are different.

FIGS. 3a and 3b show a heat exchanger 30 according to a first embodiment of the present invention. As shown in the external view of FIG. 3b, heat exchanger 30 is substantially cylindrical in overall form and has a fuel inlet 32 located at one end of the heat exchanger.

FIG. 3a shows a cross section through the central plane of the heat exchanger 30. The direction of fuel movement through the heat exchanger is shown by arrows F. Walls 36 enclose the components of the heat exchanger. In the interior of the heat exchanger 30 there is a fuel inlet cavity 34 and a heat-exchanger matrix 35. The heat exchanger matrix 35 may be in any known form, but in this embodiment comprises a plurality of tubes 40 and a plurality of passages 38 around the tubes. The tubes 40 allow fuel to pass from the fuel inlet cavity through the heat-exchanger whilst hot oil from the engine is passed around the outside of the tubes 40 through the passages 38 so as to warm the fuel passing through tubes 40.

The fuel inlet 32 of the heat exchanger 30 of this embodiment is arranged so that the fuel is caused to enter the interior of the heat exchanger substantially tangentially to the radius of the body of the heat exchanger. This causes the fuel entering the fuel inlet cavity 34 to swirl as shown by the flow arrows in FIG. 3a prior to entering the heat exchanger matrix 35.

The swirling motion of the fuel in the fuel inlet cavity 34 subjects the fuel to a centrifugal force. Since the density of any entrained ice particles in the fuel will be higher than that of the fuel itself, this centrifugal force causes the entrained ice particles to concentrate in the outer region of the fuel inlet cavity 34 (i.e. that closest to wall 36). This concentration of ice particles towards the outer regions of the fuel inlet cavity 34 will result in any ice particles being deposited on the wall of the heat exchanger in the region 36a and on the outer region of the face of the heat exchanger matrix 35, for example over the entrance to tubes 40a.

As a result, at least the central region of the heat exchanger matrix 35, such as tubes 40b, will remain clear of ice particles and fuel will flow through the heat exchanger matrix, be heated by the hot oil flowing through passages 38 and pass onwards towards the engine.

The ice particles deposited on the wall of the heat exchanger in the region 36a and on the outer region of the face of the heat exchanger matrix 35 in the vicinity of passages 40a will continue to receive heat from the hot oil passing through the heat exchanger (in particular oil that passes through passage 38a closest to the wall 36) and will eventually melt and pass through the heat exchanger matrix 35 as liquid water and be re-entrained in the fuel flow.

Ice can therefore be prevented from entering fuel system components downstream of the heat exchanger 30 by the swirl induced in the fuel flow prior to passing through the heat exchanger matrix 35. Furthermore, even if there is a build up of ice, this will occur on the outer regions of the heat exchanger matrix 35 and fuel will continue to flow through the tubes 40b in the central region of the heat exchanger matrix 35 and be supplied to the downstream fuel system components. Therefore there may be no need for a by-pass valve to be present to allow fuel to by-pass the heat exchanger 30 or, alternatively, if present, such a by-pass valve will only operate in extreme conditions of icing.

FIG. 4 shows a heat exchanger 30 according to a second embodiment of the present invention. In this embodiment, fuel inlet 32 is arranged to deliver the fuel centrally to the fuel inlet cavity 34. Arranged within the fuel inlet cavity 34 are a plurality of guide vanes 42 which deflect the fuel entering the cavity and are arranged so as to cause the fuel to swirl within the fuel inlet cavity as shown by the flow arrows F.

Again the swirl induced in the fuel entering the heat exchanger 30 causes any entrained ice particles to concentrate in the outer region of the fuel in the fuel inlet cavity 34 and be deposited on the outer wall of the heat exchanger in the region 36a or on the face of the heat exchanger matrix 35 in the outer region of the heat exchanger, thereby continuing to allow fuel to flow through the more central regions of the heat exchanger matrix 35.

In the embodiment shown in FIG. 4, a different arrangement of heat exchanger matrix 35 is provided. In this arrangement the fuel passes through the matrix in a plurality of tubes 40' around which hot oil from the engine flows through passages 38'.

FIG. 5 shows a heat exchanger 30 according to a third embodiment of the present invention. The heat exchanger of this embodiment is substantially the same as that of the first embodiment above, but in addition to the tangentially arranged fuel inlet 32, an impellor 46 is arranged in the fuel inlet cavity 34. The impeller 46 is driven through a shaft 44 which is mounted in a bearing 48 and retained in place by a shaft seal 50. The impeller 46 imparts rotary motion to the fuel entering and in the fuel inlet cavity 34, thereby causing the desired swirl motion which results in any entrained ice particles concentrating the outer region of the fuel inlet cavity 34 as described in relation to the first embodiment above.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, it will be appreciated that further embodiments of the present invention may use some, all or none of the above described arrangements for causing the fuel entering the heat exchanger to swirl prior to entering the heat exchanger matrix, thereby causing entrained ice particles to move to the outer region of the heat exchanger and continuing to permit fuel flow through more central regions of the heat exchanger matrix.

All references referred to above are hereby incorporated by reference.

The invention claimed is:

1. A heat exchanger for warming fuel prior to introduction of the fuel to an engine, the heat exchanger comprising:
    a fuel inlet, a fuel outlet, and a fuel inlet cavity located therebetween;
    a heat exchange matrix having heat transfer components past which the fuel flows between the fuel inlet cavity and the fuel outlet and which are arranged to be heated, the heat transfer components comprising radially inner fuel tubes and radially outer fuel tubes, the fuel tubes being located between the fuel inlet cavity and the fuel outlet; and
    swirl inducing means arranged within the fuel inlet cavity between the fuel inlet and the fuel tubes, the swirl inducing means causing fuel from the fuel inlet to swirl about an axis which is substantially parallel to the main direction of fuel flow through said fuel tubes prior to entering the fuel tubes to such an extent that the entrained ice concentrates in the radially outer fuel tubes.

2. A heat exchanger according to claim 1 wherein the swirl inducing means is arranged to cause the fuel to swirl about an axis which is substantially parallel to the main direction of fuel flow through said matrix.

3. A heat exchanger according to claim 1 wherein the swirl inducing means forms part of said fuel inlet and is arranged to cause the fuel to enter the heat exchanger substantially perpendicular to the main direction of fuel flow through said matrix and at a position offset from a central axis of the heat exchanger.

4. A heat exchanger according to claim 3 wherein the heat exchanger is substantially cylindrical and the swirl inducing means is arranged to cause the fuel to enter the heat exchanger substantially tangentially.

5. A heat exchanger according to claim 1 wherein the swirl inducing means includes a guide vane arranged to cause the fuel to swirl prior to the fuel entering said matrix.

6. A heat exchanger according to claim 1 wherein the swirl inducing means includes a driven element which is arranged to cause the fuel to swirl prior to the fuel entering said matrix.

7. A heat exchanger according to claim 6 wherein the driven element is an impeller which is arranged to rotate about an axis which is substantially parallel to the main direction of fuel flow through said matrix.

8. A gas turbine engine having a heat exchanger according to claim 1.

9. A method of treating fuel having entrained ice in a heat exchanger, the method including comprising the steps of:
    causing the fuel to swirl within a fuel inlet cavity between a fuel inlet and the fuel tubes about an axis which is substantially parallel to the main direction of the fuel flow so that the entrained ice concentrates in an outer portion of the fuel flow; and
    passing the swirled fuel through a heat exchanger matrix, wherein the matrix comprises radially inner and radially outer fuel tubes, and the ice concentrates in the radially outer fuel tubes.

10. A method according to claim 9 wherein the step of causing the fuel to swirl causes at least some of the entrained ice to deposit on a surface of the heat exchanger prior to the fuel entering the heat exchanger matrix.

11. A method according to claim 10 further including the step of heating the surface on which the ice is deposited so that ice deposited on that surface melts and is subsequently entrained in the fuel flowing through the matrix.

12. A method according to claim 9 wherein the step of causing said fuel to swirl includes causing the fuel to enter the heat exchanger substantially perpendicular to the main direction of fuel flow through said matrix and at a position offset from a central axis of the heat exchanger.

13. A method according to claim 9 wherein the step of causing said fuel to swirl includes mechanical agitation of the fuel.

14. A heat exchanger for warming fuel prior to introduction of the fuel to an engine, the heat exchanger comprising:
    a fuel inlet, a fuel outlet, and a fuel inlet cavity located therebetween;
    a heat exchange matrix having heat transfer components past which the fuel flows between the fuel inlet cavity and the fuel outlet and which are arranged to be heated, the heat transfer components comprising a plurality of fuel tubes between the fuel inlet cavity and the fuel outlet; wherein
    the heat exchanger is substantially cylindrical, and
    the fuel inlet is arranged to cause fuel enter the heat exchanger substantially tangentially and perpendicular to the main direction of fuel flow through the matrix and at a position offset from a central axis of the heat exchanger such that fuel is caused to swirl prior to entering the plurality of fuel tubes.

15. A heat exchanger for warming fuel prior to introduction of the fuel to an engine, the heat exchanger comprising:
    a fuel inlet, a fuel outlet, and a fuel inlet cavity located therebetween;
    a heat exchange matrix having heat transfer components past which the fuel flows between the fuel inlet cavity and the fuel outlet and which are arranged to be heated, the heat transfer components comprising a plurality of fuel tubes between the fuel inlet cavity and the fuel outlet; and
    a guide vane arranged to cause the fuel to swirl prior to the fuel entering the matrix.

16. A heat exchanger for warming fuel prior to introduction of the fuel to an engine, the heat exchanger comprising:
    a fuel inlet, a fuel outlet, and a fuel inlet cavity located therebetween;
    a heat exchange matrix having heat transfer components past which the fuel flows between the fuel inlet cavity and the fuel outlet and which are arranged to be heated, the heat transfer components comprising a plurality of fuel tubes between the fuel inlet cavity and the fuel outlet; and
    a driven element which is arranged to cause the fuel to swirl prior to the fuel entering the matrix.

17. A method of treating fuel having entrained ice in a heat exchanger, the method comprising the steps of:
    causing the fuel to swirl so that the entrained ice concentrates in an outer portion of the fuel flow; and
    passing the swirled fuel through a heat exchanger matrix; wherein the step of causing the fuel to swirl includes mechanical agitation of the fuel, by a mechanical agitator.

* * * * *